(12) United States Patent
Tsujimura

(10) Patent No.: US 9,745,412 B2
(45) Date of Patent: Aug. 29, 2017

(54) PROCESS FOR PRODUCTION OF THERMOPLASTIC CURED EPOXY RESIN WITH TRANSPARENCY TO VISIBLE LIGHT, AND THERMOPLASTIC EPOXY RESIN COMPOSITION

(71) Applicant: NAGASE CHEMTEX CORPORATION, Osaka-shi, Osaka (JP)

(72) Inventor: Yutaka Tsujimura, Tatsuno (JP)

(73) Assignee: NAGASE CHEMTEX CORPORATION, Osaka (JP)

(*) Notice: Subject to any disclaimer, the term of this patent is extended or adjusted under 35 U.S.C. 154(b) by 11 days.

(21) Appl. No.: 14/205,950

(22) Filed: Mar. 12, 2014

(65) Prior Publication Data

US 2014/0194590 A1 Jul. 10, 2014

Related U.S. Application Data

(63) Continuation-in-part of application No. 13/143,856, filed as application No. PCT/JP2010/050172 on Jan. 8, 2010, now abandoned.

(30) Foreign Application Priority Data

Jan. 9, 2009 (JP) .................................. 2009-003427

(51) Int. Cl.
C08L 63/00 (2006.01)
C08G 59/68 (2006.01)

(52) U.S. Cl.
CPC .................. *C08G 59/686* (2013.01)

(58) Field of Classification Search
CPC .............................. C08G 59/02; C08G 59/686
(Continued)

(56) References Cited

U.S. PATENT DOCUMENTS 3,350,353 A * 10/1967 Alvey .................. C08G 59/066
525/523
3,367,990 A 2/1968 Bremmer
(Continued)

FOREIGN PATENT DOCUMENTS

EP 0 396 912 A1 11/1990
EP 0 567 066 A2 10/1993
(Continued)

OTHER PUBLICATIONS

Office Action issued on Jul. 16, 2013 from the European Patent Office in European Application No. 10729252.6.
(Continued)

*Primary Examiner* — David Karst
(74) *Attorney, Agent, or Firm* — Sughrue Mion, PLLC

(57) ABSTRACT

Provided are a thermoplastic epoxy resin composition comprising (A) an epoxy compound having two epoxy groups in one molecule, (B) a compound having two phenolic hydroxyl groups in one molecule, and at least one compound selected from the group consisting of dihexylamine, diheptylamine, di(2-ethylhexyl)amine, N-ethylhexylamine, trihexylamine, dioctylamine, tri n-octylamine, N,N-dimethyl-n-octylamine, and N,N-dimethyldecylamine as (C) a curing accelerator, and a thermoplastic cured epoxy resin with transparency to visible light produced by curing the thermoplastic epoxy resin composition.

4 Claims, 1 Drawing Sheet

(58) Field of Classification Search
USPC .................................................. 525/523, 50
See application file for complete search history.

(56) References Cited

U.S. PATENT DOCUMENTS

| | | | |
|---|---|---|---|
| 4,105,634 A * | 8/1978 | Hanson | C08G 59/066 |
| | | | 525/523 |
| 6,486,256 B1 * | 11/2002 | Tarbutton et al. | 525/65 |
| 6,613,839 B1 * | 9/2003 | Gan et al. | 525/117 |
| 2003/0176594 A1 * | 9/2003 | Loontjens et al. | 525/437 |
| 2006/0135710 A1 | 6/2006 | Shirrell | |

FOREIGN PATENT DOCUMENTS

| | | |
|---|---|---|
| GB | 2 032 436 A | 5/1980 |
| JP | 10-36639 A | 2/1998 |
| JP | 10-077329 A | 3/1998 |
| JP | 10-237271 A | 9/1998 |
| JP | 2001-348419 A | 12/2001 |
| JP | 2006-036801 A | 2/2006 |
| JP | 2006-321897 A | 11/2006 |
| WO | 99/55757 | 11/1999 |

OTHER PUBLICATIONS

Office Action dated Dec. 11, 2015 from the Korean Intellectual Property Office in corresponding Korean Application No. 10-2011-7018101.
Extended European Search Report dated Feb. 7, 2017 from the European Patent Office in corresponding European Application No. 16201175.3.

* cited by examiner

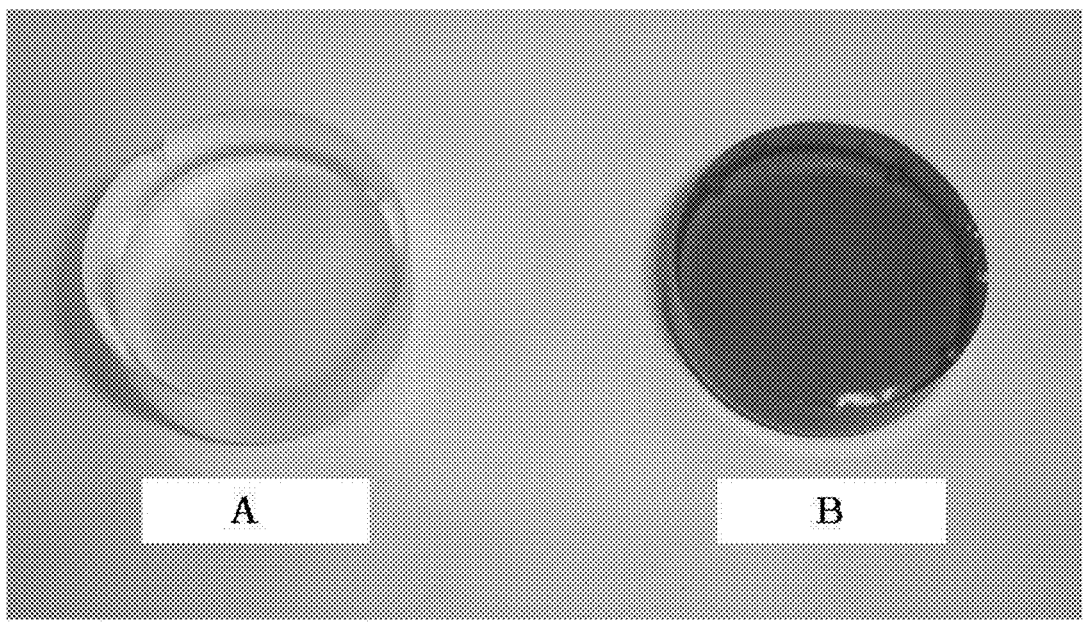

PROCESS FOR PRODUCTION OF THERMOPLASTIC CURED EPOXY RESIN WITH TRANSPARENCY TO VISIBLE LIGHT, AND THERMOPLASTIC EPOXY RESIN COMPOSITION

CROSS REFERENCE TO RELATED APPLICATIONS

This application is a continuation-in-part of U.S. application Ser. No. 13/143,856, filed Aug. 15, 2011, which is a 371 of PCT/JP2010/050172 filed Jan. 8, 2010, which claims priority to Japanese Application No. 2009-003427, filed Jan. 9, 2009, the contents of all of which are incorporated herein by reference in their entirety.

TECHNICAL FIELD

The present invention relates to a process for producing a thermoplastic cured epoxy resin by polymerizing a bifunctional epoxy compound and a bifunctional phenol compound. More particularly, it relates to a process for producing a thermoplastic cured epoxy resin with transparency to visible light and to a composition that is to be used for the process to afford a thermoplastic cured epoxy resin with transparency to visible light.

BACKGROUND ART

A thermoplastic epoxy resin, which is a straight-chain, high-molecular-weight epoxy polymer, has recently been used for various applications because it can be melted by heating and it is superior in flexibility, processability, and adhesion property and therefore it becomes possible to allow reuse, recycle, and secondary fabrication, which have been impossible to do for conventional thermosetting epoxy resins (see, for example, Patent Documents 1 to 3).

A thermoplastic epoxy resin is a liner polymer that is formed through chain extension caused by addition polymerization of a bifunctional epoxy compound and a compound having two active hydrogen-containing groups, e.g., a bifunctional phenol compound, accompanied by ring-opening of an epoxy ring. However, since an alcoholic hydroxyl group is generated as a result of a reaction of a bifunctional epoxy compound with an active hydrogen-containing group, e.g., a phenolic hydroxyl group, a polymer with a branched chain structure is formed if the alcoholic hydroxyl group reacts on an epoxy group. Polymers having such a structure tend to become gelled and it is difficult to melt them by heating and they are poor in solubility in solvent, so that they fail to exert properties as thermoplastic resin.

Conventionally, alkali metal compounds have been known as a polymerization catalyst for polymerizing a bifunctional epoxy compound and a bifunctional phenol compound. However, there is a problem that their reaction products are prone to gelate. Therefore, what is desirable as a curing accelerator for obtaining a thermoplastic polymer by polymerizing a bifunctional epoxy compound with a bifunctional phenol compound is an agent that restrains a reaction between one epoxy group and another epoxy group or a reaction between an epoxy group and an alcoholic hydroxyl group and instead causes a reaction between an epoxy group and a phenolic hydroxyl group. Phosphorus-based compounds and imidazole-based compounds have been suggested as such a curing accelerator, and especially, phosphorus-based curing accelerators, such as triphenyl phosphine (TPP) and tri-o-tolylphosphine (TOTP), have been used from the viewpoint of realizing good thermoplasticity of a cured product (see, for example, Patent Document 3).

However, in the case of using such a curing accelerator when producing a thermoplastic cured epoxy resin by polymerizing a bifunctional epoxy compound and a bifunctional phenol compound, the following problem is known. That is, the use of such a compound causes a product to color in orange to red though the reason for this is unclear, so that the use or application of the product will be limited. This does not very often become a problem in the field of products which are less influenced by the coloring of a resin itself. Because of the coloring of a resin itself, however, conventional thermoplastic epoxy resin compositions cannot be used successfully for products with which the influence on appearance should be taken into consideration.

PRIOR ART DOCUMENTS

Patent Documents

Patent Document 1: Japanese Patent Application Laid-Open No. 2001-335617
Patent Document 2: Japanese Patent Application Laid-Open No. 10-237271
Patent Document 3: Japanese Patent Application Laid-Open No. 2006-321897

SUMMARY OF THE INVENTION

Problems to be Solved by the Invention

In view of the above-described situation, the object of the present invention is to provide a process for producing a thermoplastic cured epoxy resin that has transparency to visible light and realizes good thermoplasticity and a composition that is to be used for the process and affords a thermoplastic cured epoxy resin with transparency to visible light.

The present inventor investigated earnestly in order to solve the above-mentioned problems and found that triphenylamine (TPA), which is similar in structure to a phosphorus-based curing accelerator TPP, could not cure a thermoplastic epoxy resin composition. It was also found that triethylamine could not be used as a curing accelerator. As a result of further study, it was also found that nitrilotrialkanols and a certain kind of trialkylamines were unexpectedly effective as curing accelerators of thermoplastic epoxy resin compositions and also found that the use of such a curing accelerator prevented a cured product from coloring. Further study on the basis of these findings led to the present invention.

Means for Solving the Problems

That is, the present invention is directed to a process for producing a thermoplastic cured epoxy resin with transparency to visible light, which comprises curing (A) an epoxy compound having two epoxy groups in one molecule with (B) a compound having two phenolic hydroxyl groups in one molecule by means of at least one compound represented by the following general formula (1) as (C) a curing accelerator.

$$R_n\text{—}NH_m \quad (1)$$

In formula (1), R represents a monovalent group that is a hydrocarbon group having 2 to 10 carbon atoms (with the proviso that when the hydrocarbon group has 3 or more carbon atoms the hydrocarbon group may be a straight chain or branched chain) that may have a hydroxyl group at the β position with respect to the nitrogen atom, and when R has no hydroxyl group, the number of carbon atoms is 3 to 10; n is an integer of 1 to 3, m is an integer of 2 to 0, and n+m=3; a plurality of Rs may be the same or different from each other.

The present invention is also directed to a thermoplastic epoxy resin composition for the use for the above-mentioned process, comprising (A) an epoxy compound having two epoxy groups in one molecule, (B) a compound having two phenolic hydroxyl groups in one molecule, and at least one compound selected from the group consisting of monoethanolamine, diethanolamine, triethanolamine, triisopropanolamine, tri(2-butanol)amine, tri(t-butanol)amine, tri(3-methyl-2-butanol)amine, tri(2-pentanol)amine, tri(2-methyl-2-butanol)amine, N-butyldiethanolamine, N,N-dibutylethanolamine, tri-n-propylamine, tri-n-butylamine, trihexylamine, and tripentylamine as (C) a curing accelerator.

Further, the present invention is also directed to a thermoplastic epoxy resin composition for the use for the above-mentioned process, comprising (A) an epoxy compound having two epoxy groups in one molecule, (B) a compound having two phenolic hydroxyl groups in one molecule, and at least one compound selected from the group consisting of dihexylamine, diheptylamine, di(2-ethylhexyl)amine, N-ethylhexylamine, trihexylamine, dioctylamine, tri-n-octylamine, N,N-dimethyl-n-octylamine, and N,N-dimethyldecylamine as (C) a curing accelerator.

The present invention is also directed to a thermoplastic cured epoxy resin with transparency to visible light produced by curing the above-mentioned composition.

Effect of the Invention

By the above-mentioned constitution, the present invention can obtain a thermoplastic cured epoxy resin with transparency to visible light. In the present invention, "to have transparency to visible light" means that when a cured product about 3 mm in thickness is observed visually under white light, it is observed as being colorless and transparent or no coloration is observed in transparency. Such cured products do not always have such colorlessness and transparency as that optical materials are required to have, but they have colorlessness and light permeability such that they actually do not influence the appearance of products due to coloration under white light. As to the strength of the cured product of the present invention, a strength comparable to that achieved in the use of a phosphorus-based curing accelerator can be realized. Moreover, the composition of the present invention can secure a curing rate that is high enough for practical use. The cured product of the present invention has good thermoplasticity.

BRIEF DESCRIPTION OF THE DRAWINGS

FIG. 1 A photograph in substitution for a drawing, showing the appearance of the cured products of A (Example 1) and B (Comparative Example 4).

MODE FOR CARRYING OUT THE INVENTION

Examples of the epoxy compound having two epoxy groups in one molecule (A) include low molecular weight diepoxy compounds, e.g., mononucleus aromatic diepoxy compounds having one benzene ring, such as catechol diglycidyl ether, resorcinol diglycidyl ether, tert-butylhydroquinone diglycidyl ether, and phthalic acid diglycidyl ether, alicyclic epoxy compounds, such as dimethylolcyclohexane diglycidyl ether, 3,4-epoxycyclohexenylmethyl-3,4-epoxycyclohexenyl carboxylate, and limonenedioxide, bisphenol type epoxy compounds, such as bis(4-hydroxyphenyl)methane diglycidyl ether, 1,1-bis(4-hydroxyphenyl)ethane diglycidyl ether, and 2,2-bis(4-hydroxyphenyl)propane diglycidyl ether, and oligomer mixtures (collectively, also called "bisphenol type epoxy resins") resulting from partial condensation of such bisphenol type epoxy compounds, 3,3',5,5'-tetramethylbis(4-hydroxyphenyl)methane diglycidyl ether, 3,3',5,5'-tetramethyl-bis(4-hydroxyphenyl) ether diglycidyl ether, hydroquinone diglycidyl ether, methylhydroquinone diglycidyl ether, 2,5-di-tert-butylhydroquinone diglycidyl ether, biphenyl type or tetramethylbiphenyl type epoxy resins, and bisphenol fluorene type or biscresol fluorene type epoxy resins. These may be used solely or alternatively two or more of them may be used. Among these are preferred bisphenol type epoxy resins.

The epoxy compound (A) may be a compound that exists in a liquid form at normal temperature (25° C.). Even if it is a solid compound, it can be used in the form of a solution prepared using a solvent. Moreover, it can also be dissolved in a compound (B) in a liquid form. Therefore, although the upper limit of the molecular weight of the epoxy compound is not particularly defined, the weight average molecular weight of an oligomer is usually 200 to 1500.

In the compound having two phenolic hydroxyl groups in one molecule (B), a phenolic hydroxyl group refers to a hydroxyl group substituted for a hydrogen atom on an aromatic ring. Examples of the aforementioned compound (B) include mononucleus aromatic dihydroxy compounds having one benzene ring, such as catechol, resorcinol, hydroquinone, methylhydroquinone, t-butylhydroquinone, and 2,5-di-t-butylhydroquinone, bisphenols, such as 2,2-bis(4-hydroxyphenyl)propane (bisphenol A), 1,1-bis(4-hydroxyphenyl)ethane (bisphenol AD), bis(hydroxyphenyl)methane (bisphenol F), bisphenol fluorene, and biscresol fluorene, compounds having fused rings, such as dihydroxynaphthalene, and bifunctional phenol compounds in which an allyl group has been introduced, such as diallylresorcinol, diallylbisphenol A, and triallyldihydroxybiphenyl. These may be used solely or alternatively two or more of them may be used. Among these are preferred bisphenol A and bisphenol fluorene.

The above-mentioned compound (B) may be a compound that exists in a liquid form at normal temperature (25° C.). Even if it is a solid compound, it can be used in the form of a solution prepared using a solvent. Moreover, it can also be dissolved in an epoxy compound (A) in a liquid form. Therefore, although the upper limit of the molecular weight of the compound (B) is not particularly defined, the upper limit is usually about 200 to about 500.

The compounded amount of the epoxy compound (A) and the compound (B) is preferably 0.9 to 1.1 mol, more preferably 0.95 to 1.05 mol of the compound (B) relative to 1 mol of the epoxy compound (A).

The epoxy compound (A) and the compound (B) can be polymerized in a straight chain form by a polyaddition reaction illustrated in the following scheme. Whether being a thermoplastic epoxy resin or not can be checked by the solubility of a cured product in a solvent, thermo melting property, and the like.

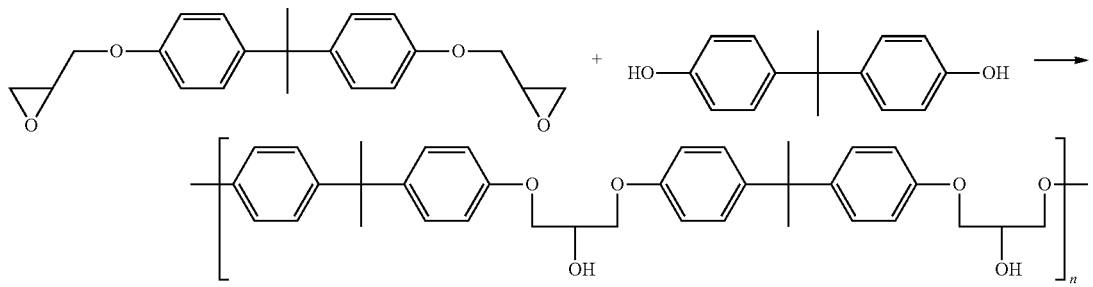

[Chem. 1]

As a curing accelerator (C), at least one compound represented by the above general formula (1) is used. Among these, compounds wherein R in the above general formula (1) represents a hydrocarbon group having 2 to 10 carbon atoms (the hydrocarbon group may be a straight or branched chain when having 3 or more carbon atoms) and having a hydroxyl group at the β position with respect to the nitrogen atom are preferred, and compounds wherein R in the above general formula (1) represents a hydrocarbon group having 2 to 6 carbon atoms are more preferred. In the above general formula (1), n is preferably 2 or 3, and n is more preferably 3.

Examples of the curing accelerator (C) include alcoholamines and alkylalcoholamines each having a straight or branched, preferably saturated, hydrocarbon chain (e.g., alkyl groups, such as methyl, ethyl, n-propyl, isopropyl, n-butyl, isobutyl, sec-butyl, tert-butyl, n-pentyl, 2-pentyl, 3-pentyl, i-pentyl, 2-methylbutyl, 3-methylbutyl, neo-pentyl, n-hexyl, isohexyl, neohexyl, n-heptyl, 2-heptyl, and n-decyl, or hydrocarbon chains each resulting from the removal of one hydrogen atom from such an alkyl group when having a hydroxyl group). Specific examples of the alcoholamines include monoethanolamine, diethanolamine, triethanolamine, triisopropanolamine, tri(2-butanol)amine, tri(t-butanol)amine, tri(2-pentanol)amine, tri(3-methyl-2-butanol)amine, and tri(2-methyl-2-butanol)amine. Among these, triethanolamine, triisopropanolamine, monoethanolamine, and diethanolamine are preferred, and triethanolamine is more preferred because its reaction speed is high and a high flexural strength is achieved.

Specific examples of the alkylalcoholamines include N-butyldiethanolamine, N,N-dibutylethanolamine, 3-diethylamino-1-propanol, 4-(butylamino)-1-butanol, 1-dibutylamino-2-propanol, and 1-dibutylamino-2-butanol. Among these, N-butyldiethanolamine and N,N-dibutylethanolamine are preferred because a high flexural strength is achieved and N,N-dibutylethanolamine has an additional advantage that the curing time is short.

As the curing accelerator (C), one member or two or more members selected from among the aforementioned alcoholamines may be used and also one member or two or more members selected from among the aforementioned alkylalcoholamines may be used. Alternatively, one member or two or more members selected from among the aforementioned alcoholamines and one member or two or more members selected from among the aforementioned alkylalcoholamines may be used together.

The curing accelerator (C) also may be a compound wherein R in the above general formula (1) represents a straight- or branched-chain, preferably saturated, monovalent hydrocarbon group having 3 to 10 carbon atoms, preferably having 3 to 6 carbon atoms, and having no hydroxyl group (e.g., methyl, ethyl, n-propyl, isopropyl, n-butyl, isobutyl, sec-butyl, tert-butyl, n-pentyl, 2-pentyl, 3-pentyl, i-pentyl, 2-methylbutyl, 3-methylbutyl, neo-pentyl, n-hexyl, isohexyl, neohexyl, n-heptyl, 2-heptyl, n-octyl and n-decyl). In the above general formula (1), n is preferably 2 or 3 and is more preferably 3. Preferable examples of such compounds include straight-chain or branched-chain dialkylamines or trialkylamines. Specific examples of the dialkylamines include diisobutylamine, di-sec-butylamine, diisopentylamine, N-sec-butylpropylamine, dipropylamine, dipentylamine, dihexylamine, diheptylamine, dioctylamine, di(2-ethylhexyl)amine, and N-ethylhexylamine, and examples of the trialkylamines include tripropylamine (straight chain; the same is applied hereinafter), tri-n-butylamine, triisobutylamine, tripentylamine (straight chain; the same is applied hereinafter), trihexylamine (straight chain; the same is applied hereinafter), trioctylamine (straight chain; the same is applied hereinafter), (N,N-diisopropylethylamine, triisopentylamine, N,N-dimethyl-n-octylamine, and N,N-dimethyldecylamine. These may be used solely or two or more of these may be used. Among these, dihexylamine, diheptylamine, di(2-ethylhexyl)amine, N-ethylhexylamine, trihexylamine, dioctylamine, tri-n-octylamine, N,N-dimethyl-n-octylamine, and N,N-dimethyldecylamine, or their combination is preferred, tri-n-octylamine is more preferred.

When a compound wherein R in the above general formula (1) represents a hydrocarbon group having 2 to 10 carbon atoms and having a hydroxyl group at the β position with respect to the nitrogen atom is used as the curing accelerator (C), its use amount is preferably, from the viewpoint of achievement of a higher molecular weight, 0.5 to 10 parts by weight, more preferably 1.5 to 6 parts by weight, and particularly preferably 1.5 to 3 parts by weight relative to 100 parts by weight of the aforementioned epoxy compound (A).

When a compound wherein R in the above general formula (1) represents a hydrocarbon group having 3 to 10 carbon atoms and having no hydroxyl group is used as the curing accelerator (C), its use amount is preferably, from the viewpoint of achievement of a higher molecular weight and transparency of the cured epoxy resin composition to visible light, 0.01 to 10 parts by weight, more preferably 0.1 to 5 parts by weight, and particularly preferably 1 to 2.3 parts by weight relative to 100 parts by weight of the aforementioned epoxy compound (A). In this regard, it is mentioned that when the curing accelerator is tri-n-octylamine, its use amount is preferably, from the viewpoint of achievement of transparency of the cured epoxy resin composition to visible light, 0.01 to 2.3 parts by weight, more preferably 0.1 to 2.3 parts by weight, and particularly preferably 1 to 2.3 parts by weight relative to 100 parts by weight of the aforementioned epoxy compound (A).

In order to afford stable thermoplasticity and increase the rate of reaction, the curing accelerator (C) may be a combination of a compound wherein R in the above general formula (1) represents a hydrocarbon group having 2 to 10 carbon atoms and having a hydroxyl group at the β position with respect to the nitrogen atom and a compound wherein R in the above general formula (1) represents a monovalent hydrocarbon group having 3 to 10 carbon atoms and having no hydroxyl group. In this case, the combination ratio, expressed in weight ratio, of the compound wherein R in the above general formula (1) represents a hydrocarbon group having 2 to 10 carbon atoms and having a hydroxyl group at the β position with respect to the nitrogen atom to the compound wherein R in the above general formula (1) represents a monovalent hydrocarbon group having 3 to 10 carbon atoms and having no hydroxyl group is preferably 1 to 100:100 to 1, more preferably 1 to 10:10 to 1. The sum total of the use amounts of the compound wherein R in the above general formula (1) represents a hydrocarbon group having 2 to 10 carbon atoms and having a hydroxyl group at the β position with respect to the nitrogen atom and the compound wherein R in the above general formula (1) represents a monovalent hydrocarbon group having 3 to 10 carbon atoms and having no hydroxyl group is preferably 0.01 to 10 parts by weight, more preferably 0.1 to 5 parts by weight, and particularly preferably 1 to 3 parts by weight relative to 100 parts by weight of the abovementioned epoxy compound (A).

Examples of the combined use of alkylamine and alcoholamine or alkylalcoholamine include a combination of at least one of dihexylamine, diheptylamine, di(2-ethylhexyl)amine, N-ethylhexylamine, trihexylamine, dioctylamine, tri-n-octylamine, N,N-dimethyl-n-octylamine, and N,N-dimethyldecylamine as alkylamine, and at least one of monoethanolamine, diethanolamine, triethanolamine, triisopropanolamine, tri(2-butanol)amine, tri(t-butanol)amine, tri(2-pentanol)amine, tri(3-methyl-2-butanol)amine, tri(2-methyl-2-butanol)amine, N-butyldiethanolamine, and N,N-dibutylethanolamine as alcoholamine or alkylalcoholamine.

Moreover, a solvent may be used for the purpose of viscosity adjustment or the like so long as the object of the present invention is not disturbed. Examples of the solvent include ketones, such as acetone, methyl ethyl ketone (MEK), methyl isobutyl ketone (MIBK), and cyclohexanone, and ethers, such as methylcellosolve, and ethylene glycol dibutyl ether. Among these, acetone is preferred because it vaporizes easily at the time of curing by heating. The use amount is preferably 0.1 to 15 parts by weight, and more preferably 4 to 8 parts by weight relative to 100 parts by weight of the resin component. If too little, phenols will be separated, and if too much, physical properties will deteriorate greatly due to the remaining of the solvent after polymerization.

In addition, a colorant, a UV absorber, an antioxidant for resistance to heat, an antioxidant for resistance to light, a toughening agent, a plasticizer, and the like may be blended if desired so long as the object of the present invention is not disturbed.

The composition of the present invention can be obtained by combining and mixing the above-described components. At this time, it may be either a one-component composition or a two-component composition. In this case, the above-mentioned curing accelerator (C) may have been added to the epoxy compound (A), the compound (B), or both.

In the curing step in the process of the present invention, although the temperature range in which a curing reaction is caused varies with the kinds of the reactive compositions and the curing accelerator to be used, the curing temperature is usually 120 to 180° C. and the curing time is usually 5 minutes to about 24 hours.

In accordance with the present invention, a thermoplastic cured epoxy resin with transparency to visible light can be obtained by using the composition of the present invention. The cured product has thermomeltability, transparency, and solubility in solvent and it can have sufficient flexural strength.

EXAMPLES

The present invention is described in more detail below with reference to Examples, but the following description is only for illustration and the invention is not limited to these Examples.

Examples 1 to 9, Comparative Examples 1 to 6

Thermoplastic epoxy resin compositions were obtained by mixing raw materials for use shown in the following Table 1 in parts by weight given in the table.

The obtained compositions developed no polymerization reaction during their preparation and their storage at room temperature. The meanings of the codes in Table 1 are as follows.

AER260: Bisphenol type liquid epoxy resin produced by Asahi Kasei Corporation (epoxy equivalent weight: 190 g/eq)
BPA: Bisphenol A (hydroxyl group equivalent: 114 g/eq) produced by Mitsui Chemicals, Inc.
TOTP: Tri-o-tolylphosphine (molecular weight: 304) produced by Hokko Chemical Industry Co., Ltd.
TPP: Triphenylphosphine (molecular weight: 262) produced by Hokko Chemical Industry Co., Ltd.
Triphenylimidazole: 2,4,5-Triphenylimidazole
TBZ: A compound represented by the following formula, wherein n=3.

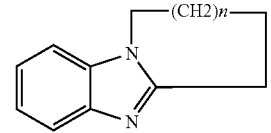

[Chem. 2]

The obtained compositions were each put in an aluminum pan 18 mm in diameter, and at 130° C. the compositions with the use of triethanolamine, triisopropanolamine, monoethanolamine, or diethanolamine were each cured for 6 hours, the composition with the use of N-butyldiethanolamine was cured for 3 hours, and the compositions with the use of tri-n-propylamine, tri-n-butylamine, tripentylamine, trihexylamine, triethylamine, TPP, TOTP, TBZ, or triphenylimidazole were each cured for 1 hour. The cured products were evaluated for their appearance, solubility in solvent, and molecular weight by the following methods. For Example 1, 2 and 7 and Comparative Examples 3 and 4, the obtained compositions were cured under the same condition by using a mold for producing a bending specimen, thereby producing bending specimens. The flexural strength was evaluated by the following method. The results were shown in Table 1. In Comparative Example 1 using triphenylamine, however, the curing time could not be shown in the table because no cured product was obtained. Moreover, performance evaluation was not carried out.

Example 10

Thermoplastic epoxy resin compositions (10-1)-(10-7) were obtained by the same procedure as that in Example 1 except that tri-n-octylamine was used as the curing accelerator (C) in the use amount indicated in Table 2. The cured products were evaluated for their appearance, solubility in solvent, and molecular weight by the same methods as those in Example 1. The results were shown in Table 2. In Table 2, no data means that no evaluation was performed.

Since the obtained cured products were remelted by only heating for 1 minute at 150 to 200° C., it was successfully confirmed that they were capable of being bended easily and they were straight-chain polymer having no cross-linked structure.

Flexural strength: The measurement of static flexural strength (MPa) (Examples 1, 2 and 7 and Comparative Examples 3 and 4) was conducted by a three-point bending test in accordance with ASTM D-790 using an INSTRON universal material tester. The shape of the specimen is defined by height h=6 mm, width b=13 mm, and length l=120 mm, and the bending span is 100 mm. The measurement temperature is 25° C. Appearance: A cured product (18 mm in diameter and 3 mm in thickness) was placed on white paper, and its transparency was observed by visual observation under natural light. For Example 1 and Comparative Example 4, a photograph in substitution for a drawing showing the appearance of the cured products was shown in FIG. 1. A (Example 1) was transparent and B (Comparative Example 4) was colored in red. Solubility in solvent: Whether the cured product was dissolved in tetrahydrofuran (evaluation ○) or not (evaluation x) was observed. Dissolution condition: cured product/tetrahydrofuran=1/100 (weight ratio). Weight average molecular weight: A cured product was dissolved in tetrahydrofuran and then a molecular weight was measured in terms of polystyrene by GPC. Measurement conditions: 40° C., flow rate=1 ml/min.

TABLE 1

| | Examples | | | | | | |
|---|---|---|---|---|---|---|---|
| | 1 | 2 | 3 | 4 | 5 | 6 | 7 |
| AER260 | 100 | 100 | 100 | 100 | 100 | 100 | 100 |
| BPA | 60 | 60 | 60 | 60 | 60 | 60 | 60 |
| Triethanolamine | 3 | — | — | — | — | — | — |
| Triisopropanolamine | — | 3 | — | — | — | — | — |
| Monoethanolamine | — | — | 3 | — | — | — | — |
| Diethanolamine | — | — | — | 3 | — | — | — |
| N-Butyldiethanolamine | — | — | — | — | 3 | — | — |
| Tri-n-propylamine | — | — | — | — | — | 3 | — |
| Tri-n-butylamine | — | — | — | — | — | — | 3 |
| Tripentylamine | — | — | — | — | — | — | — |
| Trihexylamine | — | — | — | — | — | — | — |
| Triphenylamine | — | — | — | — | — | — | — |
| Triethylamine | — | — | — | — | — | — | — |
| TPP | — | — | — | — | — | — | — |
| TOTP | — | — | — | — | — | — | — |
| TBZ | — | — | — | — | — | — | — |
| Triphenylimidazole | — | — | — | — | — | — | — |
| Curing time (h) | 6 | 6 | 6 | 6 | 3 | 1 | 1 |
| Appearance | Transparent | Transparent | Transparent | Transparent | Transparent | Transparent | Transparent |
| Solubility in solvent | ○ | ○ | ○ | ○ | ○ | ○ | ○ |
| Weight average molecular weight | 23000 | 8200 | 12300 | 14700 | 35000 | 66000 | 64000 |
| Flexural strength (Mpa) | 100 | 12 | — | — | — | — | 100 |
| Remarks | — | — | — | — | — | — | — |

| | Examples | | Comparative Examples | | | | | |
|---|---|---|---|---|---|---|---|---|
| | 8 | 9 | 1 | 2 | 3 | 4 | 5 | 6 |
| AER260 | 100 | 100 | 100 | 100 | 100 | 100 | 100 | 100 |
| BPA | 60 | 60 | 60 | 60 | 60 | 60 | 60 | 60 |
| Triethanolamine | — | — | — | — | — | — | — | — |
| Triisopropanolamine | — | — | — | — | — | — | — | — |
| Monoethanolamine | — | — | — | — | — | — | — | — |
| Diethanolamine | — | — | — | — | — | — | — | — |
| N-Butyldiethanolamine | — | — | — | — | — | — | — | — |
| Tri-n-propylamine | — | — | — | — | — | — | — | — |
| Tri-n-butylamine | — | — | — | — | — | — | — | — |
| Tripentylamine | 3 | — | — | — | — | — | — | — |
| Trihexylamine | — | 3 | — | — | — | — | — | — |
| Triphenylamine | — | — | 4 | — | — | — | — | — |
| Triethylamine | — | — | — | 3 | — | — | — | — |
| TPP | — | — | — | — | 4 | — | — | — |
| TOTP | — | — | — | — | — | 2 | — | — |
| TBZ | — | — | — | — | — | — | 2 | — |
| Triphenylimidazole | — | — | — | — | — | — | — | 2 |
| Curing time (h) | 1 | 1 | — | 1 | 1 | 1 | 1 | 1 |

TABLE 1-continued

| Appearance | Transparent | Transparent | — | Transparent | Orange | Red | Red | Pale yellow |
|---|---|---|---|---|---|---|---|---|
| Solubility in solvent | ○ | ○ | — | X | ○ | ○ | X | X |
| Weight average molecular weight | 57100 | 53302 | — | — | 140000 | 90000 | — | — |
| Flexural strength (Mpa) | — | — | — | — | 91 | 88 | — | — |
| Remarks | — | — | Not cured | — | — | — | — | — |

TABLE 2

| | Example 10 | | | | | | |
|---|---|---|---|---|---|---|---|
| | 10-1 | 10-2 | 10-3 | 10-4 | 10-5 | 10-6 | 10-7 |
| AER260 | 100 | 100 | 100 | 100 | 100 | 100 | 100 |
| BPA | 60 | 60 | 60 | 60 | 60 | 60 | 60 |
| Tri-n-octylamine | 1.0 | 2.0 | 2.2 | 2.3 | 2.4 | 2.5 | 3.0 |
| Curing time (h) | 1 | 1 | 1 | 1 | 1 | 1 | 1 |
| Appearance | Transparent | Transparent | Transparent | Transparent | Turbid | Turbid | Turbid |
| Weight average molecular weight | 16540 | 31000 | No data | 31140 | No data | No data | No data |

These results clearly showed that the cured products obtained by the process of the present invention had thermomeltability and solubility in solvent and they were thermoplastic epoxy resins. Moreover, that they had transparency was shown. On the other hand, no cured product was obtained in the case of using triphenylamine (Comparative Example 1), and solubility in solvent was not shown in the case of using triethylamine (Comparative Example 2). The cured products using TPP (Comparative Example 3) or TOTP (Comparative Example 4) showed solubility in solvent and showed that thermoplastic epoxy resins were obtained, but they were colored. The cured products using TBZ (Comparative Example 5) or triphenylimidazole (Comparative Example 6) failed to have solubility in solvent.

The cured products obtained by curing the compositions of the present invention, especially, the cured products using triethanolamine or tri-n-butylamine showed values of flexural strength improved in comparison to the cases using conventional phosphorus-based curing accelerators (Comparative Examples 3 and 4).

Since the cured products using the compositions of the present invention are those having physical properties as thermoplastic epoxy resins and also having transparency, they can be used for various applications, such as plastics for electronic parts, adhesive, paint, multilayer film, and plastic molded articles, and the degree of freedom of coloring increases because they have a transparent ground color.

The invention claimed is:

1. A thermoplastic epoxy resin composition comprising (A) an epoxy compound having two epoxy groups in one molecule, (B) a compound having two phenolic hydroxyl groups in one molecule, and at least one compound selected from the group consisting of dihexylamine, diheptylamine, di(2-ethylhexyl)amine, N-ethylhexylamine, trihexylamine, dioctylamine, N,N-dimethyl-n-octylamine, and N,N-dimethyldecylamine as (C) a curing accelerator,
   wherein the epoxy compound (A) and the compound (B) are capable of being polymerized in a straight chain form by a polyaddition reaction, and
   wherein the curing accelerator (C) further contains at least one compound selected from the group consisting of tri(t-butanol)amine, tri(2-pentanol)amine, tri(3-methyl-2-butanol)amine, tri(2-methyl-2-butanol)amine, and N,N-dibutylethanolamine.

2. The thermoplastic epoxy resin composition according to claim 1, wherein the curing accelerator (C) is contained in an amount of 0.01 to 10 parts by weight relative to 100 parts by weight of the epoxy compound (A).

3. The thermoplastic epoxy resin composition according to claim 1, wherein the compounded amount of the epoxy compound (A) and the compound (B) is 0.9 to 1.1 mol of the compound (B) relative to 1 mole of the epoxy compound (A).

4. A thermoplastic cured epoxy resin with transparency to visible light produced by curing the thermoplastic epoxy resin composition according to claim 1.

* * * * *